US009080513B2

(12) United States Patent
Ziminsky et al.

(10) Patent No.: US 9,080,513 B2
(45) Date of Patent: Jul. 14, 2015

(54) METHOD AND APPARATUS FOR COMBUSTING SYNGAS WITHIN A COMBUSTOR

(75) Inventors: Willy Steve Ziminsky, Simpsonville, SC (US); Gilbert Otto Kraemer, Greer, SC (US); Ertan Yilmaz, Albany, NY (US)

(73) Assignee: General Electric Company, Schenectady, NY (US)

( * ) Notice: Subject to any disclaimer, the term of this patent is extended or adjusted under 35 U.S.C. 154(b) by 1157 days.

(21) Appl. No.: 11/931,801

(22) Filed: Oct. 31, 2007

(65) Prior Publication Data

US 2009/0107105 A1 Apr. 30, 2009

(51) Int. Cl.
*F02C 3/20* (2006.01)
*F02C 1/00* (2006.01)
*F02C 3/22* (2006.01)
*F02C 9/40* (2006.01)
*F23R 3/36* (2006.01)

(52) U.S. Cl.
CPC ... *F02C 3/22* (2013.01); *F02C 9/40* (2013.01); *F23R 3/36* (2013.01); *F23N 2037/08* (2013.01); *F23N 2041/20* (2013.01)
USPC .......................................... 60/39.463; 60/734

(58) Field of Classification Search
USPC ............................................. 60/39.463, 734
See application file for complete search history.

(56) References Cited

U.S. PATENT DOCUMENTS

| | | | |
|---|---|---|---|
| 4,761,948 A * | 8/1988 | Sood et al. | 60/39.281 |
| 5,865,023 A * | 2/1999 | Sorensen et al. | 60/775 |
| 6,082,092 A * | 7/2000 | Vandervort | 60/773 |
| 6,201,029 B1 * | 3/2001 | Waycuilis | 518/703 |
| 6,343,462 B1 | 2/2002 | Drnevich et al. | |
| 6,367,239 B1 * | 4/2002 | Brown et al. | 60/775 |
| 6,928,821 B2 | 8/2005 | Gerhold | |
| 7,137,257 B2 | 11/2006 | Drnevich et al. | |
| 7,395,670 B1 * | 7/2008 | Drnevich et al. | 60/780 |
| 7,464,555 B2 * | 12/2008 | Bachovchin et al. | 60/777 |
| 2003/0217555 A1 * | 11/2003 | Gerhold | 60/776 |

(Continued)

FOREIGN PATENT DOCUMENTS

| | | |
|---|---|---|
| JP | 02263701 A | 10/1990 |
| JP | 07-224688 | 8/1995 |

(Continued)

OTHER PUBLICATIONS

Krisztina Valler, Agnes Wopera, Arpad B. Palotas, Co-combustion of Synthesis Gas and Natural Gas, Department of Combustion Technology and Thermal Energy, Third European Combustion Meeting ECM 2007, 4 pages, University of Miskolc, Hungary.

(Continued)

*Primary Examiner* — Gerald L Sung
(74) *Attorney, Agent, or Firm* — Armstrong Teasdale LLP

(57) ABSTRACT

A method for operating a combustor is provided. The method includes supplying a predetermined amount of a first gaseous fuel to the combustor, wherein the first gaseous fuel has a first Modified Wobbe Index (MWI) and a first fuel reactivity, and supplying a predetermined amount of a second gaseous fuel to the combustor, wherein the second gaseous fuel has a second MWI that is lower than the first MWI and a second fuel reactivity that is higher than the first fuel reactivity. The method also includes mixing the first and second gaseous fuels together to form a blended gaseous fuel, and injecting the blended gaseous fuel into the combustor.

19 Claims, 1 Drawing Sheet

(56) References Cited

U.S. PATENT DOCUMENTS

2004/0226299 A1* 11/2004 Drnevich .................. 60/772
2006/0046218 A1   3/2006 Joklik et al.
2007/0037105 A1   2/2007 Pfefferle et al.
2007/0082306 A1   4/2007 Drnevich et al.

FOREIGN PATENT DOCUMENTS

| JP | 09-053464     |   | 2/1997  |
|----|---------------|---|---------|
| JP | 09-068054     |   | 3/1997  |
| JP | 2000054852    | A | 2/2000  |
| JP | 2002061517    | A | 2/2002  |
| JP | 2002511127    | A | 4/2002  |
| JP | 2004535529    | A | 11/2004 |
| WO | 2006091379    | A2| 8/2006  |

OTHER PUBLICATIONS

Qingguo Zhang, David R. Noble, Tim Lieuwen, Blowout Measurements in a Syngas-Fired Gas Turbine Combustor, School of Aerospace Engineering, Georgia Institute of Technology, Atlanta, GA, The 22nd Annual International Pittsburgh Coal Conference Sep. 12-15, 2005 Pittsburgh, PA., 6 pages.

D.M. Erickson, S.A. Day, R. Doyle, Design Considerations for Heated Gas Fuel, GE Power Systems (Mar. 2003), Greenville, SC.

Robert Swanekamp; Media for Power Engineering; Handle With Care; PennWell Corporation; 2007; 12 pages.

Notice of Reasons for Refusal from JP Application No. 2008-272569 dated Mar. 5, 2013.

* cited by examiner

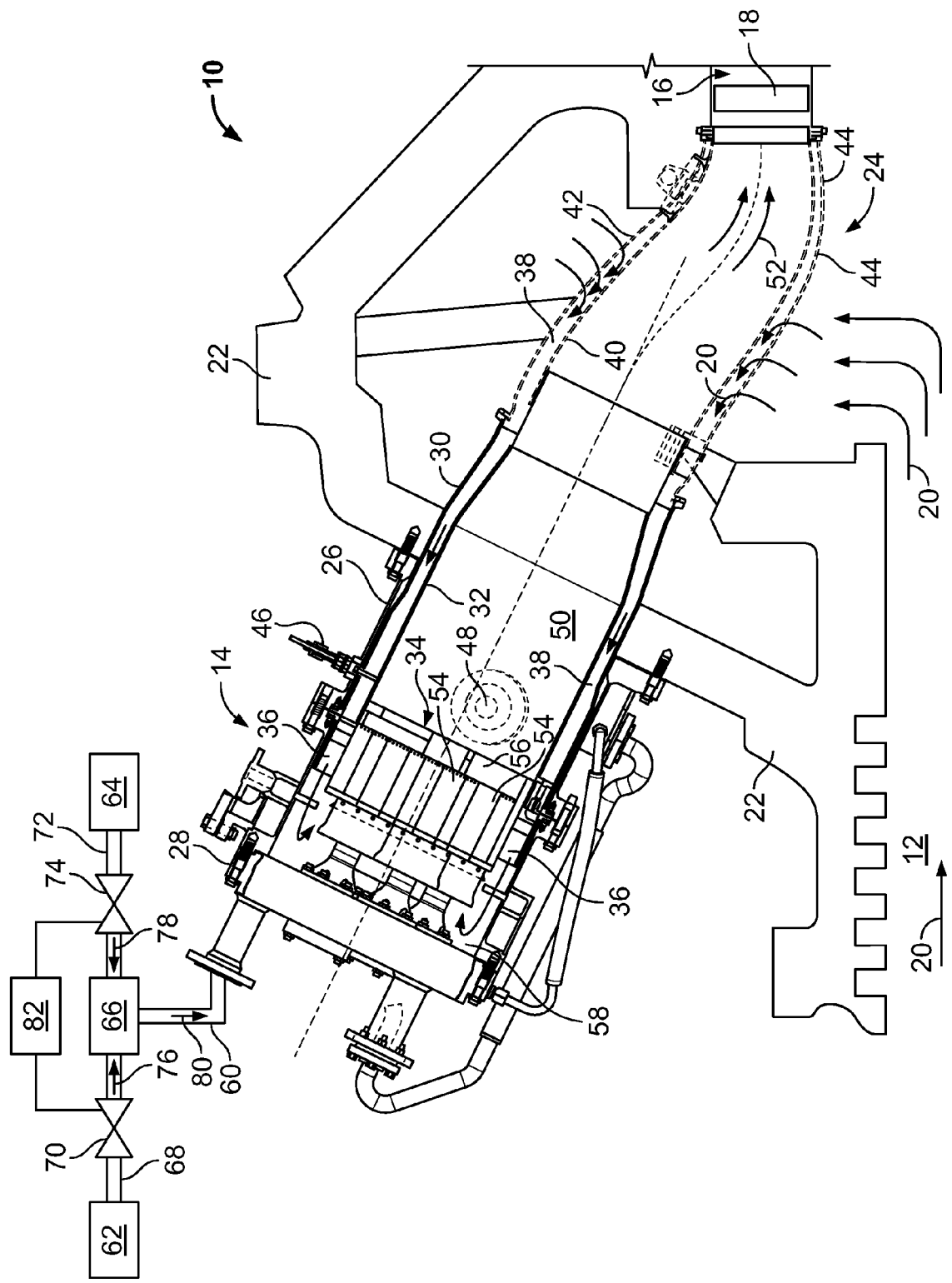

METHOD AND APPARATUS FOR COMBUSTING SYNGAS WITHIN A COMBUSTOR

BACKGROUND OF THE INVENTION

This invention relates generally to a combustor, and, more specifically, to a dry-low nitrogen oxide (NOx) (DLN) combustion system for a gas turbine engine.

Combustion systems of at least some known gas turbine engines combust synthesis gas, or syngas, to create exhaust gases that drive a gas turbine. However, some known syngases have a low heating value as compared to other fuels, such as, natural gas, and, as such, may also have a low Modified Wobbe Index (MWI) as compared to other fuels. Additionally, some known syngases have a significant hydrogen content, based on molar fuel fractions, that can result in a highly reactive fuel stream with a very small characteristic chemical time. Due to this combination of low MWI and high fuel reactivity, conventional premixed DLN combustion systems can experience flashback when combusting syngas. "Flashback" refers to a condition that may occur when the aerodynamics of fuel introduction and mixing are overcome by the rapid chemistry of the combustion process thus allowing the reaction to stabilize within the premixing device. It is well established that the characteristic chemical time of the fuel can be used to correlate flashback, and that, the longer the characteristic chemical time, the slower the reaction and hence the lower proclivity of the fuel to induce a flashback event. Over time, occurrences of flashback may be damaging to hardware within the combustor. To reduce flashback occurrences within some known dry-low NOx combustion systems, narrow fuel specifications for both hydrogen content and MWI are required for normal operation.

To dispense with flashback concerns, some known combustion systems that combust syngas are based on diffusion combustors that do not premix fuel with air, and are not susceptible to flashback. Such systems inject a diluent to reduce NOx emissions by suppressing the peak temperatures of the reaction. However, the proximity of the nitrogen supply to the combustion system and the additional compression the nitrogen may require before injection may add complexity and/or cost to the combustion systems, as compared to systems that do not include nitrogen injection into the combustor.

Another known system introduces a nitrogen-water vapor mixture as the diluent, and yet another of the known systems injects a fuel-water vapor mixture into the combustor to control NOx formation, and still another uses carbon dioxide. Ultimately, water availability and water quality may adversely affect such systems, and, as such, combustors using steam injection may require costly and complex steam systems to avoid the adverse effects of the water.

BRIEF DESCRIPTION OF THE INVENTION

In one aspect, a method for operating a combustor is provided. The method includes supplying a predetermined amount of a first gaseous fuel to the combustor, wherein the first gaseous fuel has a first Modified Wobbe Index (MWI) and a first fuel reactivity, and supplying a predetermined amount of a second gaseous fuel to the combustor, wherein the second gaseous fuel has a second MWI that is lower than the first MWI and a second fuel reactivity that is higher than the first fuel reactivity. The method also includes mixing the first and second gaseous fuels together to form a blended gaseous fuel, and injecting the blended gaseous fuel into the combustor.

In another aspect, a dry low NOx combustor is provided. The combustor includes a combustion zone and a nozzle in flow communication with the combustion zone for injecting a blended gaseous fuel into the combustion zone. The nozzle receives the blended gaseous fuel that includes a predetermined amount of a first gaseous fuel and a predetermined amount of a second gaseous fuel, wherein a Modified Wobbe Index (MWI) of the first gaseous fuel is higher than an MWI of the second gaseous fuel and a fuel reactivity of the first gaseous fuel is lower than a fuel reactivity of the second gaseous fuel.

In still another aspect, a combustion system is provided. The combustion system includes a dry low NOx combustor and a blending device in flow communication with a first gaseous fuel source and a second gaseous fuel source. The blending device receives a first gaseous fuel having a first Modified Wobbe Index (MWI) and a first fuel reactivity from the first gaseous fuel source and receives a second gaseous fuel having a second MWI and a second fuel reactivity from the second gaseous fuel source. The second MWI is lower than the first MWI, and the second fuel reactivity is higher than the first fuel reactivity. The blending device is for combining the first and second gaseous fuels into a blended gaseous fuel. The system also includes an injection device in flow communication with the dry low NOx combustor and the blending device. The injection device is for injecting the blended gaseous fuel into the dry low NOx combustor.

BRIEF DESCRIPTION OF THE DRAWINGS

FIG. 1 is partial schematic side view of an exemplary gas turbine combustion system.

DETAILED DESCRIPTION OF THE INVENTION

FIG. 1 is partial schematic side view of an exemplary gas turbine engine 10. Gas turbine engine 10 includes a compressor 12, a dry-low NOx combustor 14, and a turbine 16. Only a first stage nozzle 18 of turbine 16 is shown in FIG. 1. In the exemplary embodiment, turbine 16 is rotably coupled to compressor 12 with rotors (not shown) that are coupled to a single common shaft (not shown). Compressor 12 pressurizes inlet air 20 that is then channeled to combustor 14 for cooling combustor 14 and to provide air for the combustion process. More specifically, air 20 channeled to combustor 14 flows in a direction that is generally opposite to the flow of air through engine 10. In the exemplary embodiment, gas turbine engine 10 includes a plurality of combustors 14 that are oriented circumferentially about engine casing 22. More specifically, in the exemplary embodiment, combustors 14 are, for example, but are not limited to being, can-annular combustors.

In the exemplary embodiment, combustor 14 includes a double-walled transition duct 24 that is coupled upstream from turbine 16. Further, in the exemplary embodiment, each combustor 14 includes a substantially cylindrical combustor casing 26 that is coupled to engine casing 22 and to an end cover assembly 28. End cover assembly 28 includes, for example, supply tubes, manifolds, valves for channeling gaseous fuel, liquid fuel, air and/or water to the combustor, and/or any other components that enable engine 10 to function as described herein.

In the exemplary embodiment, a substantially cylindrical flow sleeve 30 is coupled within combustor casing 26 such that sleeve 30 is substantially concentrically aligned with casing 26. Flow sleeve 30, in the exemplary embodiment, includes a combustion liner 32 coupled therein. Combustion liner 32 is aligned substantially concentrically within flow sleeve 30 and is coupled to a combustion liner cap assembly 34. Combustion liner cap assembly 34 is secured within combustor casing 26 by a plurality of struts 36 and an associated mounting assembly (not shown). Liner 32 is coupled to an inner wall 40 of transition duct, and flow sleeve 30 is coupled to an outer wall 42 of transition duct 24.

In the exemplary embodiment, an air passage 38 is defined between liner 32 and flow sleeve 30, and between inner and outer walls 40 and 42, respectively, of transition duct 24. Transition duct outer wall 42 includes a plurality of apertures 44 defined therein that enable compressed air 20 from compressor 12 to enter air passage 38. In the exemplary embodiment, air 20 flows in a direction that is generally opposite to a direction of core flow (not shown) from compressor 12 towards end cover assembly 28. Further, in the exemplary embodiment, combustor 14 also includes a plurality of spark plugs 46 and a plurality of cross-fire tubes 48. Spark plugs 46 and cross-fire tubes 48 extend through ports (not shown) in liner 32 that are defined downstream from combustion liner cap assembly 34 and within a combustion zone 50. Spark plugs 46 and cross-fire tubes 48 ignite fuel and air within each combustor 14 to create combustion gases 52.

In the exemplary embodiment, a plurality of fuel nozzle assemblies 54 are coupled to end cover assembly 28. Although, only one type of fuel nozzle assembly 54 is described herein, more than one type of nozzle assembly, or any other type of fuel nozzle, may be included in combustor 14. In the exemplary embodiment, combustion liner cap assembly 34 includes a plurality of premix tube assemblies 56 that each substantially circumscribe a respective fuel nozzle assembly 54. Each premix tube assembly 56, in the exemplary embodiment, includes an assembly including two tubes (not shown) that are separated by a premix tube hula seal (not shown). The hula seal enables the dual-tube assembly to thermally expand and contract as combustion liner cap assembly 34 expands during operating conditions.

Furthermore, in the exemplary embodiment, each premix tube assembly 56 includes a collar (not shown) that supports an air swirler (not shown), which may be, for example, positioned adjacent to a radially outermost wall (not shown) of each fuel nozzle assembly 54, formed integrally with each nozzle assembly 54, and/or configured in any other suitable configuration that enables engine 10 to function as described herein. The orientation of swirlers causes air 20 flowing through air passage 38 to reverse direction at a combustor inlet end 58 of combustor 14 (between end cover assembly 28 and combustion liner cap assembly 34) and to flow through the air swirlers and premix tube assemblies 56. Fuel passages (not shown) defined in each of the air swirlers channel fuel through an arrangement of apertures that continuously introduce gaseous fuel, depending upon the operational mode of gas turbine engine 10, into the passing air 20 to create a fuel and air mixture that is ignited in combustion zone 50, downstream from premix tube assemblies 56.

In the exemplary embodiment, combustor 14 includes a main fuel supply line 60 that is coupled to a first fuel supply 62 and a second fuel supply 64 via a fuel blending device 66. More specifically, a first fuel supply line 68 is coupled between first fuel supply 62 and fuel blending device 66 and includes a first flow regulation device 70. A second fuel supply line 72 is coupled between second fuel supply 64 and fuel blending device 66 and includes a second flow regulation device 74. Although only two flow regulation devices 70 and 74 are illustrated and described, combustor 14 may include any suitable number of flow regulation devices and/or other suitable components that enable combustor 14 to function as described herein. In the exemplary embodiment, first fuel supply 62, first fuel supply line 68, and/or first fuel flow regulation device 70 may include a first fuel 76 therein. Similarly, second fuel supply 64, second fuel supply line 72, and/or second fuel flow regulation device 74 may include a second fuel 78 therein. In the exemplary embodiment, first fuel 76 and second fuel 78 are different fuels having different compositions, as described in more detail below. Main fuel supply line 60 is configured to inject a blended fuel 80 from fuel blending device 66 and into combustor 14.

In the exemplary embodiment, fuel blending device 66 is configured to combine first fuel 76 and second fuel 78 into a substantially homogeneous blended fuel 80. Alternatively, first and second fuels 76 and 78 may be blended using other means than blending device 66. For example, fuels 76 and 78 may be blended within a common fuel supply (not shown), end cover assembly 28, premix tube assemblies 56, fuel nozzle assemblies 54, and/or any other suitable blending means that enables combustor 14 to function as described herein. Furthermore, in the exemplary embodiment, blending device 66 facilitates regulating a Modified Wobbe Index of blended fuel 80 by adjusting proportions of first and second fuels 76 and 78 within blended fuel 80.

As used herein, the term "Modified Wobbe Index" or "MWI" refers to a temperature-corrected Wobbe Index. The MWI is calculated using:

$$MWI = \frac{LHV}{\sqrt{Tg \cdot SG}},$$

wherein LHV is the lower heating value of the fuel in British thermal units per standard cubic foot (BTU/scf), Tg is the absolute temperature of the fuel in degrees Rankine (°R), and SG is the Specific Gravity of the fuel relative to air at ISO conditions. Such an equation is described in, for example, "Design Considerations for Heated Gas Fuel," by D. M. Erickson et al., GE Power Systems (March 2003). As such, the MWI is a calculated measurement of the volumetric energy content of a fuel and is directly related to the temperature and lower heating value of the fuel. Generally, a lower MWI indicates a low heating value, and, conversely, a higher MWI indicates high heating value. Additionally, as used herein, the term "fuel reactivity" refers to a molar hydrogen content of a fuel, which, in turn, is an indicator of a characteristic chemical time of the fuel. As is known, hydrogen is extremely flammable and the addition of hydrogen to a gaseous fuel may have a significant impact on flammability limits, flame speed, and general combustion properties of the blended stream.

In the exemplary embodiment, first fuel 76 is synthesis gas, or syngas, and second fuel 78 is natural gas. Hereinafter "first fuel" and "syngas" may be used interchangeably, and "second fuel" and "natural gas" may be used interchangeably. Furthermore, as used herein, the terms "synthesis gas" or "syngas" refer to a gaseous fuel created by a gasification process. Syngas includes primarily, but is not limited to only including, carbon monoxide (CO), carbon dioxide ($CO_2$), and hydrogen ($H_2$) with the composition being dependent upon the feedstock material. Moreover, the term "natural gas," as used herein, refers to a gaseous fuel including primarily methane ($CH_4$), but may also include, but is not limited to including, ethane ($C_2H_6$), butane ($C_4H_{10}$), propane ($C_3H_8$), carbon dioxide ($CO_2$), nitrogen ($N_2$), helium ($He_2$), and/or hydrogen sulfide ($H_2S$). For example, natural gas may have a composition of 70-90% by volume of methane, 5-15% by volume of ethane, less than 5% by volume of propane and butane, and the balance of the volumetric composition may include other gases, such as, carbon dioxide, nitrogen, and/or hydrogen sulfide.

The MWI for natural gas may be between approximately 42 and approximately 54, depending on the temperature of the natural gas. The MWI for syngas is generally below approximately 20. Furthermore, the characteristic chemical time of natural gas is approximately 5 to approximately 10 times slower than the characteristic chemical time of syngas. Generally, the MWI range and the fuel reactivity of syngas may enable flashback to occur, and accordingly, in the exemplary embodiment, a predetermined amount of natural gas 78 is blended with the syngas 76 to facilitate reducing the characteristic chemical time of the syngas 76. More specifically, in the exemplary embodiment, a percentage of natural gas 78 and a percentage of syngas 76 are selected to facilitate regulating a characteristic chemical time produced by blended fuel 80 such that flashback is facilitated to be reduced, as compared to combusting only syngas 76. In the exemplary embodiment, the percentages of syngas 76 and natural gas 78 are selected to produce a blended fuel 80 with a MWI of between approximately 15 and approximately 54. Furthermore, the blended fuel 80, in the exemplary embodiment, has a fuel reactivity with a characteristic chemical time of at least approximately twice that of syngas 76. Natural gas blending of less than 10% by volume is sufficient to approximately triple the characteristic chemical time of the syngas and hence reduce the tendency towards flashback by a factor of three.

In the exemplary embodiment, a control system 82 is operatively coupled to first and second fuel flow regulation devices 70 and 74 to control the relative quantities of first and second fuels 76 and 78, respectively, that enter fuel blending device 66. Control system 82 may be, for example, but is not limited to being, a computer system and/or any other system that enables combustor 14 to function as described herein. In the exemplary embodiment, control system 82 is configured to allow first fuel 76 having a predetermined mass and/or volumetric flow rate to flow through first fuel supply line 68 and into fuel blending device 66 to facilitate achieving a predetermined MWI and fuel reactivity of blended fuel 80. Similarly, control system 82 is configured to allow second fuel 78 having a predetermined mass and/or volumetric flow rate to flow through second fuel supply line 72 and into fuel blending device 66 to facilitate achieving the predetermined MWI and fuel reactivity of blended fuel 80.

Alternatively, control system 82 may be configured to control the relative quantities of first and second fuels 76 and 78 entering fuel blending device 66 by controlling flow properties other than mass and/or volumetric flow rate. In one embodiment, control system 82 is coupled to fuel blending device 66 to regulate and/or monitor the mixing of fuels 76 and 78 within blending device 66. In another embodiment, control system 82 is coupled to fuel blending device 66 and/or main fuel supply line 60 to regulate the quantity of blended fuel 80 injected into combustor 14. In yet another embodiment, the components within end cover assembly 28 are coupled to control system 82 for controlling blended fuel 80 entering combustor 14, fuel nozzle assemblies 54, and/or premix tube assemblies 56.

In operation, air 20 enters engine 10 through an inlet (not shown) and is compressed in compressor 12. Compressed air 20 is discharged from compressor 12 and is channeled to combustor 14. Air 20 enters combustor through apertures 44 and then flows through air passage 38 towards end cover assembly 28 of combustor 14. Air 20 flowing through air passage 38 is forced to reverse its flow direction at combustor inlet end 58 and is redirected through the air swirlers and premix tube assemblies 56.

To produce blended fuel 80 for supplying to combustor 14 through end cover assembly 28, control system 82 controls first and second fuel flow regulation devices 70 and 74 to enable respective fuels 76 and 78 to flow into fuel blending device 66. More specifically, first fuel flow regulation device 70 is controlled to allow first fuel 76 to be discharged from first fuel supply 62, through first fuel supply line 68, and into fuel blending device 66. Second fuel flow regulation device 74 is similarly controlled to allow second fuel 78 to be discharged from second fuel supply 64, through second fuel supply line 72, and into fuel blending device 66. Each fuel flow regulation device 70 and 74 is controlled to facilitate achieving a predetermined percentage by volume for each fuel 76 and 78 within blended fuel 80.

In the exemplary embodiment, natural gas 78 is blended with the syngas 76 to produce a blended fuel 80 having a percentage of natural gas 78 between about 5% and about 50% of the total volume of the blended fuel 80. In another embodiment, the percentage of natural gas 78 and syngas 76 in the blended fuel 80 is approximately 20% and approximately 80% by volume, respectively. In another embodiment, the percentages by volume of natural gas 78 and syngas 76 are based on the design of dry-low NOx combustor 14 to enable the MWI and fuel reactivity of blended fuel 80 to be within the design specifications.

In the exemplary embodiment, fuel blending device 66 combines first fuel 76 and second fuel 78 therein such that blended fuel 80 discharged from blending device 66 is substantially homogenous. Blended fuel 80 is discharged from fuel blending device 66, through main fuel supply line 60, and into combustor 14. Furthermore, in the exemplary embodiment, control system 82 regulates the air 20 and blended fuel 80 supplied to nozzle assemblies 54 and/or premix tube assemblies 56. Ignition is initially achieved when control system 82 initiates a starting sequence of gas turbine engine 10, and spark plugs 46 are retracted from combustion zone 50 once a flame has been continuously established. At the opposite end of combustion zone 50, hot combustion gases 52 are channeled through transition duct 24 and turbine nozzle 18 towards turbine 16. In one embodiment, during combustion, a flashback event is corrected by increasing the amount of first fuel 76 being injected into combustor 14 because first fuel 76 has a higher MWI and a lower fuel reactivity than second fuel 78.

The above-described methods and apparatus facilitate dry-low NOx combustion of syngas within a combustor, without the addition of a diluent. More specifically, natural gas is blended with syngas to facilitate combustion of the syngas within a dry-low NOx combustor. The addition of natural gas facilitates slowing the characteristic chemical time of syngas to prevent flashback and, as a consequence, facilitates reducing damage and/or wear to components proximate the flame. The addition of natural gas also facilitates maintaining the MWI of the injected fuel within design specifications of at least some known dry-low NOx combustors because small amounts of natural gas have a large effect on the combustion chemistry of syngas. Furthermore, the above-described method and apparatus also facilitates decreasing the cost and complexity of the combustor, as compared to combustors having syngas and diluents injected therein, because natural gas may be used as a backup fuel in combustors and, as such, may be readily available for use without additional cost and/or hardware.

Exemplary embodiments of a method and apparatus for combusting syngas within a combustor are described above in detail. The method and apparatus are not limited to the specific embodiments described herein, but rather, components of the method and apparatus may be utilized independently and separately from other components described herein. For example, the blended fuel may also be used in combination with other combustion systems and methods, and is not limited to practice with only the dry-low NOx combustor as described herein. Rather, the present invention can be implemented and utilized in connection with many other fuel combustion applications.

While the invention has been described in terms of various specific embodiments, those skilled in the art will recognize that the invention can be practiced with modification within the spirit and scope of the claims.

What is claimed is:

1. A method for operating a combustor, said method comprising:
   supplying a predetermined amount of a first gaseous fuel to a blending device, wherein the first gaseous fuel has a first Modified Wobbe Index (MWI) and a first fuel reactivity;
   supplying a predetermined amount of a second gaseous fuel to the blending device, wherein the second gaseous fuel has a second MWI and a second fuel reactivity, wherein the first MWI is greater than approximately two times the second MWI and the second fuel reactivity is higher than the first fuel reactivity;
   regulating a flow of each of the first and second gaseous fuels to the blending device to form a blended gaseous fuel having a third MWI; and
   supplying the blended gaseous fuel from the blending device to an injector of the combustor via a single main fuel line.

2. A method in accordance with claim 1 wherein regulating the flow of each of the first and second gaseous fuels to form a blended gaseous fuel further comprises mixing the first and second gaseous fuels together, wherein the first MWI is between approximately 42 BTU/SCF.° R^(0.5) and approximately 54 BTU/SCF.° R^(0.5), the second MWI is below approximately 20 BTU/SCF.° R^(0.5), and a characteristic chemical time corresponding to the first fuel reactivity is between approximately 5 times and approximately 10 times slower than a characteristic chemical time corresponding to the second fuel reactivity.

3. A method in accordance with claim 1 wherein regulating the flow of each of the first and second gaseous fuels to form a blended gaseous fuel further comprises forming the blended gaseous fuel having the third MWI between approximately 15 BTU/SCF.° R^(0.5) and approximately 54 BTU/SCF.° R^(0.5) and having a third fuel reactivity that is at least approximately two times that of at least one of the first fuel reactivity and the second fuel reactivity.

4. A method in accordance with claim 1 further comprising injecting the blended gaseous fuel into a dry low NOx combustor.

5. A method in accordance with claim 1 wherein supplying a predetermined amount of a first gaseous fuel to the combustor further comprises supplying a predetermined amount of natural gas to the combustor.

6. A method in accordance with claim 5 wherein supplying a predetermined amount of natural gas further comprises supplying natural gas to the combustor at a rate that enables the natural gas to be about 5% to about 50% of the blended gaseous fuel by volume.

7. A method in accordance with claim 1 wherein supplying a predetermined amount of a second gaseous fuel to the combustor further comprises supplying a predetermined amount of a synthesis gas to the combustor.

8. A method in accordance with claim 1 further comprising increasing the amount of the first gaseous fuel injected into the combustor to facilitate correcting a flashback event.

9. A combustion system comprising:
   a dry low NOx combustor;
   a blending device in flow communication with a first gaseous fuel source and a second gaseous fuel source;
   a first flow regulation device coupled between said blending device and the first gaseous fuel source, said first flow regulation device configured to regulate a flow of a first gaseous fuel into said blending device;
   a second flow regulation device coupled between said blending device and the second gaseous fuel source, said second flow regulation device configured to regulate a flow of a second gaseous fuel into said blending device, wherein said blending device is configured to mix the first and second gaseous fuels together to form a blended gaseous fuel;
   a single main fuel line coupled between said blending device and an injection device of said dry low Nox combustor; and
   a control system operatively coupled to said first and second flow regulation devices, said control system configured to:
      regulate said first flow regulation device to supply a predetermined amount of the first gaseous fuel to said blending device, wherein the first gaseous fuel has a first Modified Wobbe Index (MWI) and a first fuel reactivity; and
      regulate said second flow regulation device to supply a predetermined amount of the second gaseous fuel to said blending device, wherein the second gaseous fuel has a second MWI and a second fuel reactivity, wherein the first MWI is greater than approximately two times the second MWI and the second fuel reactivity is higher than the first fuel reactivity, such that the blended gaseous fuel has a third MWI.

10. A combustion system in accordance with claim 9 wherein the first MWI is between approximately 42 BTU/SCF.° R^(0.5) and approximately 54 BTU/SCF.° R^(0.5) and the second MWI is below approximately 20 BTU/SCF.° R^(0.5), and wherein said control system is further configured to regulate said first and second flow regulation devices such that the third MWI is within a design specification of said dry low Nox combustor.

11. A combustion system in accordance with claim 9 wherein said control system is further configured to regulate an injection of the blended gaseous fuel into said dry low NOx combustor.

12. A combustion system in accordance with claim 9 wherein said control system is further configured to regulate said first and second flow regulation devices such that the blended gaseous fuel includes about 5% to about 50% of the first gaseous fuel by volume.

13. A combustion system in accordance with claim 9 wherein said wherein said control system is further configured to increase an amount of the first gaseous fuel supplied to said blending device in response to a flashback event.

14. A combustion system in accordance with claim 9 wherein said injection receives a blended gaseous fuel having an MWI between approximately 15 BTU/SCF.° R^(0.5) and approximately 54 BTU/SCF.° R^(0.5) and having a third fuel reactivity that is at least approximately two times that of at least one of the first fuel reactivity and the second fuel reactivity.

15. A fuel supply system for a dry low Nox combustor, said fuel supply system comprising:
    a blending device in flow communication with a first gaseous fuel supply and a second gaseous fuel supply;
    a first flow regulation device coupled between said blending device and the first gaseous fuel supply, said first flow regulation device configured to regulate a flow of a first gaseous fuel into said blending device;
    a second flow regulation device coupled between said blending device and the second gaseous fuel supply, said second flow regulation device configured to regulate a flow of a second gaseous fuel into said blending device, wherein said blending device is configured to mix the first and second gaseous fuels together to form a blended gaseous fuel;
    a single main fuel line coupled between said blending device and an injector of the dry low Nox combustor; and
    a control system operatively coupled to said first and second flow regulation devices, said control system configured to:
        regulate said first flow regulation device to supply a predetermined amount of the first gaseous fuel to said blending device, wherein the first gaseous fuel has a first Modified Wobbe Index (MWI) and a first fuel reactivity; and
        regulate said second flow regulation device to supply a predetermined amount of the second gaseous fuel to said blending device, wherein the second gaseous fuel has a second MWI and a second fuel reactivity, wherein the first MWI is greater than approximately two times the second MWI and the second fuel reactivity is higher than the first fuel reactivity, such that the blended gaseous fuel has a third MWI.

16. A fuel supply system in accordance with claim 15, wherein the first MWI is between approximately 42 BTU/SCF.° R^(0.5) and approximately 54 BTU/SCF.° R^(0.5), and the second MWI is below approximately 20 BTU/SCF.° R^(0.5), and wherein said control system is further configured to regulate said first and second flow regulation devices such that the third MWI is within a design specification of the dry low Nox combustor.

17. A fuel supply system in accordance with claim 15, wherein said control system is further configured to regulate an injection of the blended gaseous fuel into the dry low NOx combustor.

18. A fuel supply system in accordance with claim 15, wherein said control system is further configured to regulate said first and second flow regulation devices such that the first gaseous fuel is about 5% to about 50% of the blended gaseous fuel by volume.

19. A fuel supply system in accordance with claim 15, wherein said control system is further configured to increase an amount of the first gaseous fuel supplied to said blending device in response to a flashback event.

* * * * *